United States Patent
Hussain (10) Patent No.: US 10,336,180 B2
(45) Date of Patent: Jul. 2, 2019

(54) METHOD AND SYSTEM FOR A VEHICLE COOLING SYSTEM

(71) Applicant: Ford Global Technologies, LLC, Dearborn, MI (US)

(72) Inventor: Quazi Ehtesham Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/185,242

(22) Filed: Jun. 17, 2016

(65) Prior Publication Data
US 2017/0361698 A1    Dec. 21, 2017

(51) Int. Cl.
| | | |
|---|---|---|
| B60K 11/02 | (2006.01) | |
| B60K 11/08 | (2006.01) | |
| F01P 1/06 | (2006.01) | |
| F01P 3/18 | (2006.01) | |
| F01P 5/06 | (2006.01) | |
| F01P 5/10 | (2006.01) | |
| F01P 7/02 | (2006.01) | |
| F01P 7/16 | (2006.01) | |
| F01P 11/02 | (2006.01) | |
| F02B 33/40 | (2006.01) | |
| F02M 35/10 | (2006.01) | |

(52) U.S. Cl.
CPC ............ *B60K 11/02* (2013.01); *B60K 11/085* (2013.01); *F01P 1/06* (2013.01); *F01P 3/18* (2013.01); *F01P 5/06* (2013.01); *F01P 5/10* (2013.01); *F01P 7/026* (2013.01); *F01P 7/164* (2013.01); *F01P 7/167* (2013.01); *F01P 11/0285* (2013.01); *F02B 33/40* (2013.01); *F02M 35/10268* (2013.01); *F01P 2005/105* (2013.01); *F01P 2037/00* (2013.01)

(58) Field of Classification Search
CPC .......... B60L 11/02; B60L 11/06; B60W 10/30
USPC ............................................... 180/68.1, 68.4
See application file for complete search history.

(56) References Cited

U.S. PATENT DOCUMENTS

| | | | | |
|---|---|---|---|---|
| 4,262,209 A | * | 4/1981 | Berner | .................... F02D 29/06 174/DIG. 15 |
| 6,450,275 B1 | * | 9/2002 | Gabriel | .................... B60K 6/22 165/41 |
| 6,651,761 B1 | * | 11/2003 | Hrovat | .............. H01M 8/04014 165/41 |
| 6,668,766 B1 | * | 12/2003 | Liederman | ................ F01P 5/12 123/198 C |
| 8,104,435 B2 | * | 1/2012 | Schwartz | ................ F01P 7/046 123/41.12 |

(Continued)

FOREIGN PATENT DOCUMENTS

WO    2007045030 A1    4/2007

*Primary Examiner* — Jeffrey J Restifo
(74) *Attorney, Agent, or Firm* — Julia Voutyras; McCoy Russell LLP (57) ABSTRACT

Methods and systems are provided for estimating a cooling demand of a vehicle powertrain component and selecting a mode of operation of a vehicle cooling system based on the estimated cooling demands of the vehicle powertrain component and the energy usage of the cooling system components. Based on the selected operating mode, each of a radiator fan speed, a coolant system pump output, a vehicle grille shutter opening, and an opening of vents coupled to a powertrain component insulating enclosure may be concurrently adjusted to minimize the cooling parasitic losses while satisfying the cooling requirements of the vehicle.

16 Claims, 5 Drawing Sheets

(56) References Cited

U.S. PATENT DOCUMENTS

| | | | | |
|---|---|---|---|---|
| 8,667,931 B2* | 3/2014 | Kerns | F01P 7/10 | 123/41.05 |
| 8,714,116 B2* | 5/2014 | Hartman | F01P 7/042 | 123/41.01 |
| 9,050,885 B1* | 6/2015 | Dudar | B60W 20/00 | |
| 9,512,791 B1* | 12/2016 | Dudar | F02M 25/0809 | |
| 2004/0069546 A1* | 4/2004 | Lou | B60K 6/22 | 180/65.21 |
| 2006/0185626 A1* | 8/2006 | Allen | F01P 7/048 | 123/41.12 |
| 2010/0186381 A1* | 7/2010 | Charles | F01N 3/025 | 60/282 |
| 2011/0137530 A1* | 6/2011 | Kerns | F01P 7/10 | 701/49 |
| 2011/0139525 A1* | 6/2011 | Karl | B60K 11/02 | 180/68.1 |
| 2011/0246007 A1* | 10/2011 | Choi | B60H 1/00885 | 701/22 |
| 2012/0082871 A1* | 4/2012 | Simonini | B60L 1/04 | 429/50 |
| 2012/0097465 A1* | 4/2012 | Leffert | F01P 7/12 | 180/68.1 |
| 2013/0255603 A1* | 10/2013 | Pursifull | F01P 11/16 | 123/41.15 |
| 2013/0255604 A1* | 10/2013 | Rollinger | F01P 7/048 | 123/41.15 |
| 2014/0026831 A1* | 1/2014 | Mahrs | F01P 7/04 | 123/41.05 |
| 2014/0123917 A1* | 5/2014 | Chellan | F01P 7/10 | 123/41.04 |
| 2014/0142819 A1* | 5/2014 | Pursifull | F01P 11/16 | 701/51 |
| 2014/0370795 A1* | 12/2014 | Klop | B60H 1/242 | 454/75 |
| 2015/0158378 A1* | 6/2015 | Dudar | B60K 15/03 | 701/22 |
| 2015/0361864 A1* | 12/2015 | Wagner | F01P 7/08 | 165/300 |
| 2016/0090899 A1* | 3/2016 | Hayes | F02B 29/045 | 165/51 |
| 2016/0186645 A1* | 6/2016 | Rollinger | F01P 7/16 | 701/102 |
| 2016/0186647 A1* | 6/2016 | Styron | F01P 11/18 | 123/41.02 |
| 2016/0186648 A1* | 6/2016 | Rollinger | F01P 11/18 | 123/41.15 |
| 2016/0186649 A1* | 6/2016 | Rollinger | G01F 23/2962 | 123/41.15 |
| 2016/0186650 A1* | 6/2016 | Rollinger | F01P 11/18 | 701/102 |

* cited by examiner

| Cooling system mode | AGS | Fan | Vent | Lower temp coolant pump(s) | Higher temp coolant pump(s) |
|---|---|---|---|---|---|
| 1 | Closed | Off | Closed | lower speed | lower speed |
| 2 | Closed | On, higher speed | Open | lower speed | higher speed |
| 3 | Open | Off | Open | lower speed | lower speed |
| 4 | Open | Off | Closed | lower speed | lower speed |
| 5 | Open | On, lower speed | Closed | lower speed | lower speed |

FIG. 5

METHOD AND SYSTEM FOR A VEHICLE COOLING SYSTEM

FIELD

The present description relates generally to methods and systems for adjusting a plurality of components of a vehicle cooling system.

BACKGROUND/SUMMARY

Vehicle cooling systems may include a plurality of cooling components such as radiators, cooling fans, liquid coolant circulation system, etc. The different cooling components utilize power from the engine and/or from a battery for operation. Additionally, the cooling system may receive cooling air from a front end of the vehicle, for example, through an active grille shutter (AGS) opening, to assist in cooling the engine, the transmission, and other components of the under-hood region. Such front-end air flow may cause parasitic loss of engine power by adding aerodynamic drag when the vehicle is in motion.

Various approaches may be used to reduce vehicular aerodynamic drag due to AGS opening while providing cooling to vehicle components. One example approach for AGS adjustments is shown by Klop et al. in US 20140370795. Therein, the AGS comprises angularly displaceable vanes which may be actuated to an intermediate position between a completely open position (allowing maximum intake air flow) and a closed position (completely blocking intake air flow). An actuator coupled to the vanes may be adjusted based on engine speed in order to adjust the vane openings and thereby control the aerodynamic drag caused by the air flow through the AGS.

However, the inventors herein have recognized potential issues with such systems. In particular, controlling the AGS opening based on engine speed may result in conditions where engine cooling demands and vehicle aerodynamic drag are in conflict. As one example, during high engine speed and high engine temperature conditions, the AGS may be closed to reduce aerodynamic drag, however, this may result in optimal engine cooling not being provided to the vehicle components. As another example, during conditions such as an engine cold-start where the engine speed is low and retention of engine heat is desired, the opening of the AGS may result in some air entering through the front end of the vehicle causing a reduction in engine temperature. As yet another example, during wet conditions such as during rain, or while in a car wash, the AGS may not be opened to avoid water penetration into the engine. However, during such conditions active cooling may be required for engine temperature control. While other vehicle cooling components, such as the cooling fan and the coolant circulation system, may be utilized for vehicle cooling during such conditions, continual usage of such cooling components can add to the engine's parasitic losses. In particular, the added consumption of engine power or battery power may adversely affect engine fuel efficiency and performance.

In one example, the issues described above may be addressed by a method for a vehicle comprising: estimating a powertrain component cooling demand based on operating conditions; and responsive to the powertrain component cooling demand, concurrently adjusting each of a radiator fan speed, a coolant system pump output, a vehicle grille shutter opening, and a vent opening of vents coupled to an engine insulating enclosure. In this way, by including an insulated enclosure around a powertrain component such as one of an engine, a transmission, and a torque converter, heat loss from the component may be limited and vents on the sides of the enclosure together with active grille shutters, a radiator fan, and a circulating coolant system may be adjusted concurrently for synergistic powertrain cooling benefits.

As one example, a vehicle powertrain component such as the engine, or the transmission may be enclosed within an insulated enclosure comprising adjustable vents on one or more walls. Based on a desired temperature of the enclosed component, the vents may be opened to varying degrees to facilitate flow of cool air, drawn into the underhood area via vehicle active grills shutters (AGS), through the powertrain component within the enclosure. Opening of the AGS may be coordinated with the opening of the vents on the insulated enclosures to regulate an amount, rate, and temperature of ambient air flowing into the enclosed vehicle component(s). For example, during conditions when aerodynamic drag is likely to occur and engine cooling is desired, the AGS opening may be reduced to limit aerodynamic drag while the opening of enclosure vents is increased to increase flow of cooling air through engine components. In addition, the operation of additional cooling components such as a radiator fan positioned between the AGS and the insulated enclosure, and a pump for circulating coolant through different vehicle components, may be adjusted to assist in engine cooling. As another example, during cold-start conditions, both the AGS and the vents may be held completely closed to reduce heat loss from the engine, thereby facilitating expedited heating of the enclosed engine. Depending on cooling demands of the vehicle components, the vehicle cooling system may be operated in one of a plurality of modes, each with different combinations of settings for the AGS, the enclosure vents, and the various other engine cooling components. A controller may select a mode that meets the given cooling demand with the lowest parasitic losses while taking into account losses due to aerodynamic drag, as well as fuel and battery power consumption.

In this way, by enclosing vehicle powertrain components such as an engine within an insulated enclosure with adjustable vents, dissipation of heat during low temperature operations (such as during cold-start conditions) may be reduced. By preserving engine heat during such conditions, attainment of catalyst light-off temperature may be expedited thereby improving emissions quality. Also, during engine operation at higher temperatures, by opening the vents of the enclosure, heat may be effectively dissipated from the vehicle component thereby having a cooling effect. By coordinating the operation of the adjustable vents with the operation of a vehicle's grill shutter system, heat can be retained in the engine while aerodynamic drag at the vehicle is also reduced, providing synergistic cooling benefits. The technical effect of operating the vehicle cooling system in a selected mode wherein the settings for the various cooling system components (including the adjustable vents, the AGS shutters, one or more coolant pumps, and one or more cooling/radiator fans) is adjusted to meet the cooling demands while taking into account parasitic losses caused by power usage and aerodynamic drag. Therefore, parasitic losses may be reduced without compromising engine cooling. As a result, engine performance and fuel efficiency may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
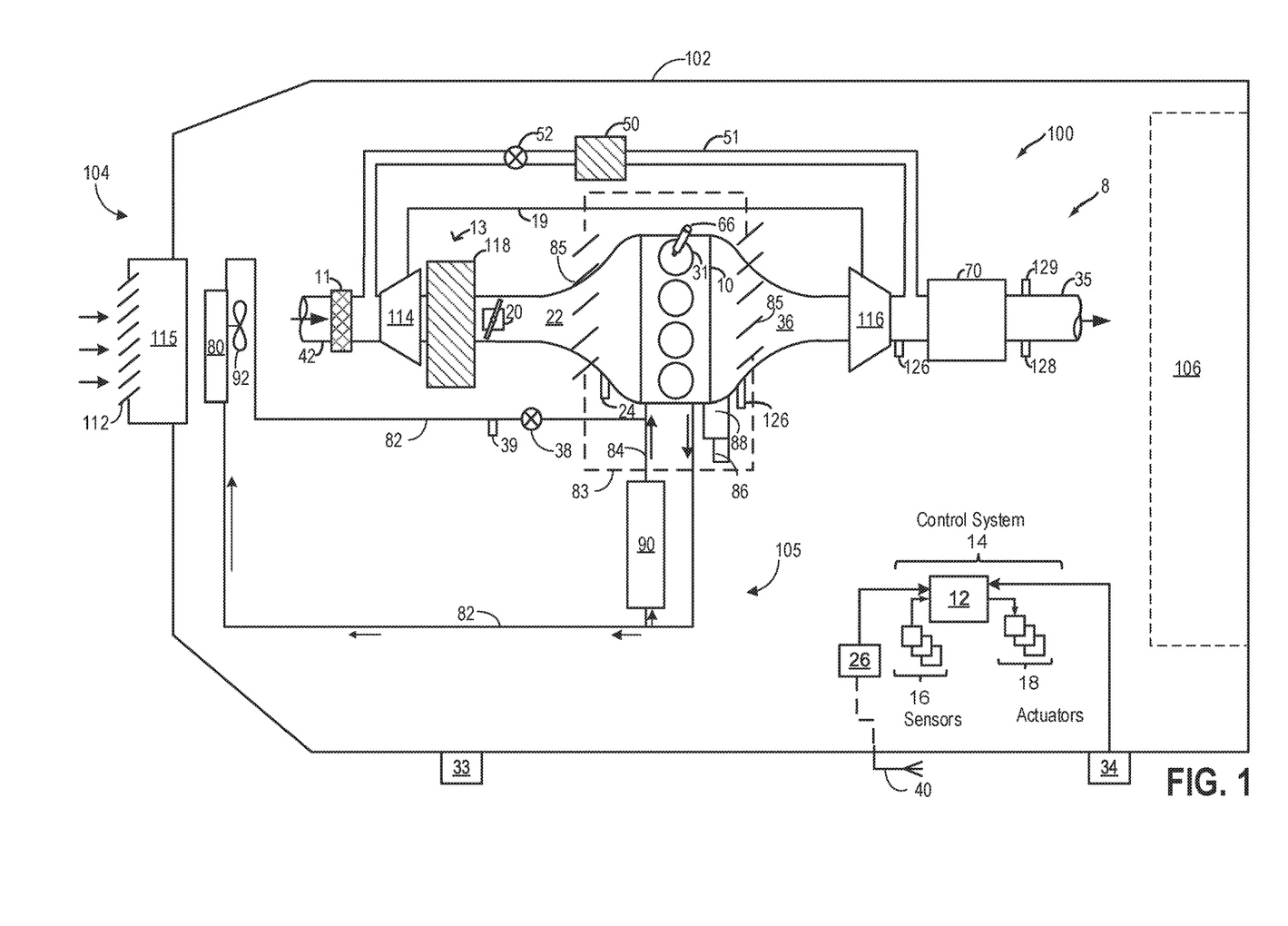
FIG. 1 shows an example embodiment of a vehicle engine system coupled to a cooling system.
Figure 2:
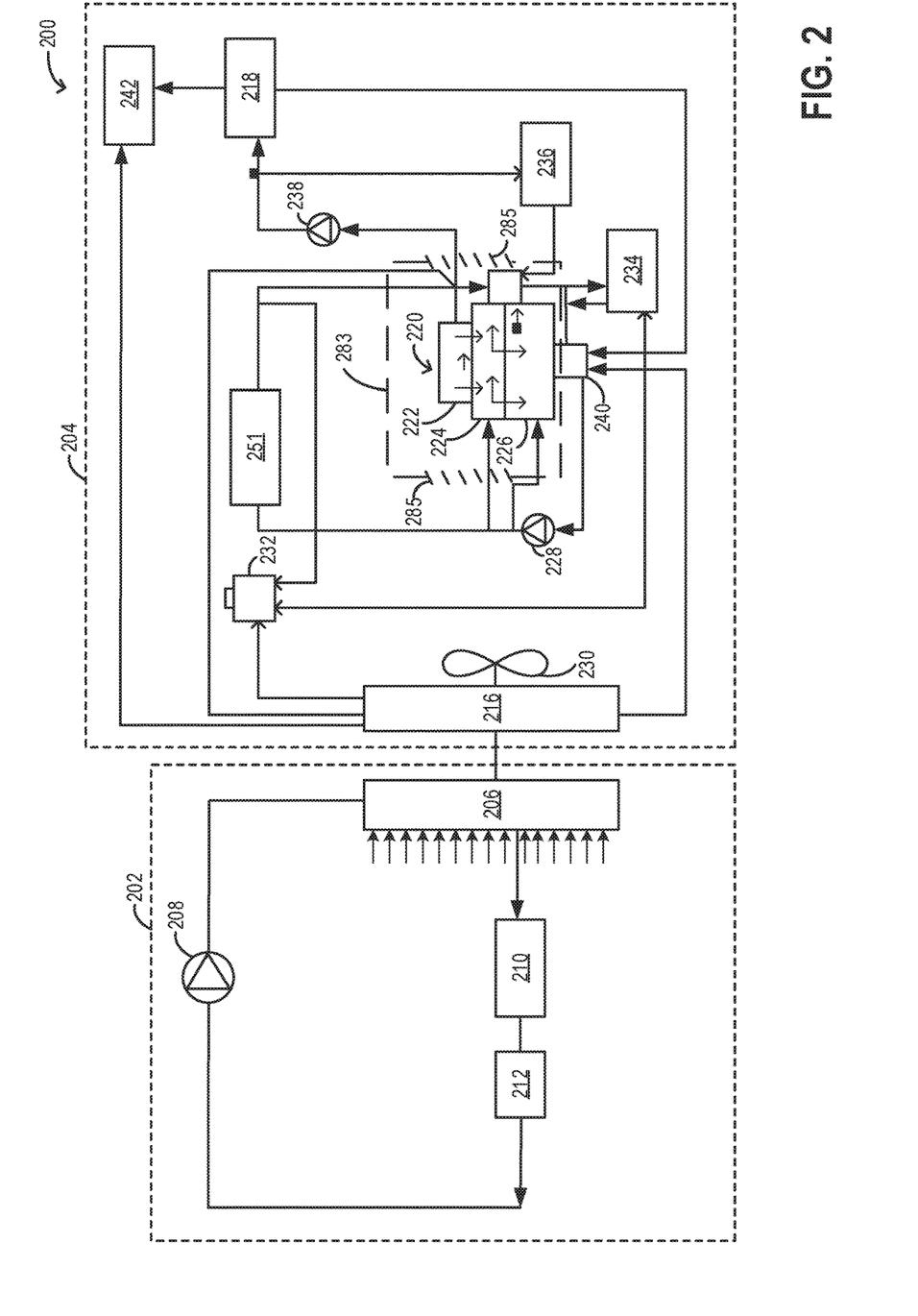
FIG. 2 shows an example embodiment of a higher temperature and a lower temperature coolant circuit of the cooling system of FIG. 1.

The following description relates to systems and methods for adjusting a plurality of settings of a vehicle cooling system based on cooling/heating demands of a vehicle powertrain component. An example engine system and an associated cooling system is shown in FIG. 1. The cooling system may comprise a lower temperature coolant circuit and a higher temperature coolant circuit, as shown in FIG. 2. An engine controller may be configured to perform a control routine, such as the example routine of FIG. 3, to select a suitable mode of operation of the cooling system and consequently adjust a setting of the plurality of components of the cooling system based on the selected mode. The different modes of operation of the vehicle cooling system are tabulated in FIG. 4. An example operation of the plurality of components of the cooling system is shown with reference to FIG. 5.

FIG. 1 shows an example embodiment of a vehicle cooling system 104 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 114 driven by a turbine 116. Specifically, fresh air is introduced along intake passage 42 into engine 10 via air cleaner 11 and flows to compressor 114. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 114 is coupled, through charge air cooler (CAC) 118 to throttle valve 20. Throttle valve 20 is coupled to engine intake manifold 22. From the compressor, the compressed air charge flows through the charge air cooler 118 and the throttle valve 20 to the intake manifold. The charge air cooler 118 may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 114. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 114. In this manner, the compressor is configured to admit exhaust tapped from downstream of turbine 116. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides homogenization of the exhaust gas into the intake air charge. Further, the disposition of EGR take-off and mixing points provides effective cooling of the exhaust gas for increased available EGR mass and improved performance.

The cooling system 104 comprises a coolant circulation system 105, active grille shutters (AGS) 115 in the front-end of the vehicle, a radiator 80 coupled to the coolant circulation system 105, and a fan 92 coupled to the radiator 80. The cooling system 104 may be divided into a higher temperature cooling circuit and a lower temperature cooling circuit, each circuit including a distinct set of vehicle components. The lower temperature cooling circuit and the higher temperature cooling circuit have separate coolant pumps which may be regulated concurrently or independent of each other to adjust coolant flow through the components of each circuit.

As elaborated with reference to FIG. 2, the higher temperature cooling circuit may comprise vehicle components that operate at a higher temperature while the lower temperature cooling circuit may comprise vehicle components that require a lower temperature for optimal operation, therefore the cooling/heating demands of the higher temperature and the lower temperature cooling circuits may vary. In one example, the lower temperature cooling circuit coolant pump may be configured to circulate coolant through the charge air cooler, and an air conditioning system, while the higher temperature cooling circuit coolant pump may be configured to circulate coolant through each of the turbocharged engine and a transmission. Details regarding each of the two circuits will be discussed in relation to FIG. 2.

The engine 100 may be enclosed in an insulated enclosure 83. In one example, the insulated enclosure 83 may be a double walled enclosure with insulating material sandwiched between the two walls, thereby restricting heat flow through the walls of the enclosure 83. There may be a gap between the outer surface of the engine components and the inner surface of the enclosure 83. In order to facilitate flow of air through the engine, adjustable vents 85 may be positioned on two opposite walls of the enclosure 83. The vents 85 may be specifically aligned with the AGS and the radiator fan 92 to allow flow of ambient air through the engine. Additionally or alternatively, the vents 85 may be included on the upper and lowers walls of the enclosure 83. The vents 85 form a part of the cooling system 104 and based on a desired temperature of the engine, the vents may be opened to varying degrees to facilitate flow of cooling air through the engine. The opening of the vents 85 may be regulated such that the vents may be either completely closed, partially open, or completely open. In one example, during cold-start conditions, when expedited engine heat-up is desired, a cooling system operating mode may be selected wherein the vents 85 may be completely closed, thereby limiting flow of cooling air through the engine, and preserving the engine heat. By enclosing the engine within an insulated enclosure, engine heat may be retained for a longer duration even after the engine is being turned off. In one example, the thermal enclosure 83 may be smaller in size and selectively enclose the cylinder head and block while the EGR cooler 50, CAC, compressor 118, turbine 116, intake manifold 22, exhaust manifold 36 etc., may be outside the enclosure.

In addition to enclosing the engine system, one or more other powertrain components, such as a transmission, and a torque converter, may also be completely or partly enclosed in an insulating enclosure. In one example, only a part of the powertrain component may be enclosed within an enclosure, while the remaining part may remain uninsulated. In another example, a powertrain component with lower cooling demand may be permanently insulated with insulating material placed directly on the component walls without the provision of having vents on the walls of an enclosure. Such arrangements may reduce packaging concerns. In still other examples, such as where the engine is coupled in a hybrid powertrain, the powertrain component may include a transaxle containing an electric machine (such as an electric motor or generator).

Active grille shutters (AGS) 115 may cover a front region of the vehicle spanning from just below the hood to the bottom of the bumper, for example. In some embodiments, all individual grilles 112 in the AGS 115 may be moved in coordination by the controller. In other embodiments, grille shutters may be divided into sub-regions and the controller may adjust opening/closing of each region independently. AGS 115 provide an opening for receiving air flow through or near the front end of the vehicle and into the engine compartment. Such air flow may then be utilized by radiator 80 and other components to keep the engine and/or transmission cool. Further, the air flow may reject heat from the vehicle air conditioning system and can improve performance of turbocharged/supercharged engines that are equipped with a charge air cooler (CAC) 118 that reduces the temperature of the air that goes into the intake manifold/engine. Other underhood components (fuel system, batteries, etc.) may benefit from the cooling air flow as well. Thus, grille shutter system may assist cooling system 104 in cooling internal combustion engine 10.

AGS 115 are moveable between an opened position and a closed position, and may be maintained at either position or a plurality of intermediate positions thereof. This is because closing and/or partially closing AGS 115 reduces an amount of air flow received through grille, thus reducing the aerodynamic drag on the vehicle. Aerodynamic drag caused by ambient air flow through the AGS may be directly proportional to vehicle speed, the higher the vehicle speed, the higher is the volume of ambient air entering through the AGS, and higher is the consequent aerodynamic drag. Maintaining the grille shutters in an open position allows for sufficient engine cooling; however, this may also increase drag on the vehicle, thereby increasing parasitic losses of engine power and decrease in fuel economy. Therefore, responsive to cooling demands, the controller may compare the parasitic losses incurred by operating the cooling system in each of a plurality of modes capable of providing desired cooling, and select the mode of operation with minimal parasitic loss of power.

The coolant circulation system 105 circulates coolant through internal combustion engine 10 to absorb waste heat and distributes the heated coolant to radiator 80 and/or heater core 90 via coolant lines 82 and 84, respectively. In particular, FIG. 1 shows cooling system 105 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be estimated based on a temperature sensor 39 and further the temperature may be regulated by a thermostat valve 38, located in the cooling line 82, which may be kept closed until the coolant reaches a threshold temperature.

The fan 92 coupled to radiator 80 may be used to maintain airflow through radiator 80 when vehicle 102 is moving slowly or stopped while the engine is running. Based on the mode of operation of the cooling system 104, the speed of the fan may be controlled by a controller 12 described in more detail hereafter. Alternatively, fan 92 may be coupled to the engine accessory drive system, driven by the engine crankshaft.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

The plurality of components of the cooling system 104 may be adjusted based on cooling demands of the engine and other vehicle components. Different cooling system components such as the radiator fan 92, and the engine-driven water pump 86 used for coolant circulation may use engine power and/or battery power for operation causing parasitic losses of power. Therefore, the cooling system 104 may be operated in a specific mode suited to provide the desired level of cooling, while minimizing the parasitic losses. The operating mode of the cooling system 104 may be based on a variety of system variables, including engine temperatures, vehicle driving conditions, condensate formation in the CAC, and outside weather conditions.

As one example, a controller may select between a first mode of operation including a first setting of each of the radiator fan speed, the coolant system pump output, the vehicle grille shutter opening, and the vent opening, and a second mode of operation including a second, different setting of each of the radiator fan speed, the coolant system pump output, the vehicle grille shutter opening, and the vent opening based on energy loss in the first mode relative to energy loss in the second mode, condensate level in the charge air cooler, local weather conditions, local weather forecast, and ambient humidity, wherein each of the first mode and the second mode meet the powertrain component cooling demand. The selecting may include selecting the first mode when the energy loss of the first mode is lower than the energy loss of the second mode, and selecting the second mode when the energy loss of the second mode is lower than the energy loss of the first mode. A method describing the selection of a particular operating mode of the cooling system 104 is discussed with relation to FIG. 3. The various operating modes are discussed with reference to FIG. 4. Each of the AGS 115 opening, position of the adjustable vents 85, radiator fan 92 speed, and water pump 86 speed may be regulated based on the selected cooling system operational mode. In this way, parasitic losses may be reduced and engine performance and fuel efficiency may be improved without compromising engine cooling.

The in-vehicle communications system 26 may communicate with a wireless communication device 40 via various wireless protocols, such as wireless networks, cell tower transmissions, and/or combinations thereof. Data obtained from the in-vehicle communications system 26 may include real-time and forecasted weather conditions. Weather conditions, such as temperature, precipitation (e.g., rain, snow, hail, etc.) and humidity, may be obtained through various wireless communication device applications and weather-forecasting websites. Current and future weather data may be correlated with current and future travel routes as obtained by the GPS 34. In one example, the communications system 26 may access various weather maps stored on the internet or other cloud computing systems. The stored weather maps may include rain, humidity, precipitation, and/or temperature information provided as contour maps, for example. In one example, the wireless communication device 40 may relay real-time humidity data to the in-vehicle communications and entertainment system 26, and/or GPS 34, which is then relayed to the controller 12. Controller 12 may also infer humidity from a plurality of sensors or vehicle system signals. These may include rain sensors, ambient humidity sensors, wiper on/off signals, or a universal exhaust gas oxygen (UEGO) sensor and system during a deceleration fuel shut off (DFSO). The controller 12 compares the received humidity data to threshold values and determines the appropriate cooling system 104 mode selection.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas temperature sensor 126, transmission oil temperature sensor, cooling system sensors (such as coolant temperature sensor 39, fan speed sensor, passenger compartment temperature sensor, etc.), CAC 118 sensors (such as CAC inlet air temperature and pressure sensors, CAC outlet air temperature and pressure sensors, etc.), exhaust oxygen sensors 128 and 129, exhaust pressure sensor, MAP sensor 24, MAF sensor, engine speed sensor, vehicle speed sensor, compressor inlet temperature sensor, compressor inlet pressure sensor, compressor inlet humidity sensor, EGR sensor. In addition, the control system 14 may receive signals from sensors such as sensor 33 positioned on the exterior of vehicle system 102. The sensor 33 may be at least one of an ambient air temperature sensor, an ambient air humidity sensor, and an ambient air pressure sensor. Other sensors such as additional pressure, temperature, air-fuel ratio, and composition sensors may be coupled to various locations in engine system 100. In addition, control system 14 may receive data from a global positioning system (GPS) 34 and/or an in-vehicle communications system 26 of vehicle 102. The actuators 18 may include, for example, AGS 115, vents 85, pump 86, fan 92 blades, throttle 20, EGR valve 52, wastegate, and fuel injector 66. The control system 14 may include a controller 12. The controller 12 may receive input data from the various sensors, process the input data, and trigger various actuators in response to the processed input data based on instruction or code programmed therein corresponding to one or more routines, such as the example routine of FIG. 3.

For example, based on each of the coolant temperature as estimated by the coolant temperature sensor 39, and the exhaust gas temperature as estimated by the exhaust gas temperature sensor 126, the controller may select a suitable mode of operation of the cooling system 104 in order to provide desired engine cooling while minimizing parasitic losses of engine power. Further, inputs from a plurality of other cooling system sensors (such as fan speed sensor, passenger compartment temperature sensor, ambient humidity sensor, etc.), and CAC 118 sensors (such as CAC inlet air temperature and pressure sensors, CAC outlet air temperature and pressure sensors, etc.) may be utilized by the controller for cooling system operational mode selection. In response to the selected cooling system 104 operational mode, a plurality of actuators including AGS 115, vents 85, pump 86, and fan 92 blades may be adjusted concurrently.

Now turning to FIG. 2, an example cooling system 200 coupled to the engine of FIG. 1 is shown. In one example, the cooling system 200 may be the cooling system 104 of FIG. 1. The cooling system 200 may be operated in a plurality of modes based on cooling demands of the engine system components and the transmission system while minimizing losses in engine power due to operation of the cooling system components.

Cooling system 200 includes a first cooling circuit 202 and a second cooling circuit 204, each coupled to different sets of engine system components. First cooling circuit 202 includes a lower temperature radiator 206, coolant pump 208, an air-conditioning system (AC) 212, and a water-air charge air cooler (CAC) 210 and constitutes a lower temperature circuit due to the lower heat rejection capacity of the circuit components. Second cooling circuit 204 includes higher temperature radiator 216, coolant pumps 228, 238, EGR cooler 251, oil cooler 234, engine components such as the turbocharger 236, heater core 218 and constitutes a higher temperature circuit due to the higher heat rejection capacity of the circuit components. Also, the transmission system 242 may be a part of the second, higher temperature cooling circuit.

Returning to first cooling circuit 202, coolant pump 208 is configured to pump hot coolant received from AC 212, and CAC 210 into radiator 206 so that heat may be rejected to the environment. The pump 208 uses engine power or battery power for operation. Specifically, ambient air (depicted by small arrows entering radiator 206) entering the vehicle via active grille shutters (such as AGS 115 of FIG. 1) located towards the front of the vehicle may flow through radiator 206, picking up heat rejected at the radiator. The AC 212 may comprise a compressor wherein air circulated through the passenger cabin may be compressed and cooled. CAC 210 may be configured to cool compressed intake aircharge received from a compressor before the aircharge is delivered to the engine intake. During boosted engine operation, intake air compressed at a compressor is delivered to the engine upon passage through the CAC (such as CAC 118 of FIG. 1). Heat from the air is rejected into coolant flowing through the CAC.

During cold CAC conditions, coolant pump 208 may be operated at a lower speed or may be deactivated in order to reduce coolant flow in first cooling circuit 202. As such, when the CAC temperature is above a first, lower threshold, EGR may be delivered to a pre-compressor location with reduced risk of CAC condensation. In one example, when the CAC temperature is above a second, higher threshold, the controller may select a mode of operation of the coolant system 200 such that the coolant pump 208 may be operated to circulate hot coolant through radiator 206, enabling temperature control of the CAC.

Second cooling circuit 204 is a traditional coolant loop and circulates coolant through internal combustion engine 220 to absorb waste engine heat and distribute the heated coolant to radiator 216 and/or heater core 218. The engine 220 may be enclosed within an insulated enclosure 283 in order to reduce dissipation of heat from the engine 220 components. In order to facilitate flow of air through the engine 220, there may be a plurality of vents 285 on opposite walls of the insulated enclosure 283. The position of the vents 285 may be adjusted in order to alter the size of the openings in the enclosure 283. Radiator 216 may include a radiator fan 230 to improve the efficiency of cooling. In one example, radiator 216 may be radiator 80 and the radiator fan 230 may be fan 92 of FIG. 1. With respect to the position of the vents, the radiator fan 230 may be positioned in a way such that air blowing from the fan may enter the insulated enclosure 283 when engine cooling is desired. The second cooling circuit also circulates coolant through EGR cooler 251 coupled to the EGR system (such as EGR system 51 in FIG. 1). Specifically, exhaust heat is rejected at EGR cooler 251 during EGR delivery. The second cooling circuit also circulates coolant through and receives heat rejected from engine oil cooler 234 and turbocharger 236.

Engine-driven water pump 228 circulates coolant through passages in engine 220, specifically, through the intake and exhaust manifolds 222, through engine head 224 and then through engine block 226 to absorb engine heat. Heat is transferred from the coolant via radiator 216 and fan 230 to ambient air. During conditions when EGR is delivered, heat rejected at EGR cooler 251 can be circulated through engine 220 and advantageously used to warm the engine, such as during cold ambient conditions. Engine-driven water pump 228 may be coupled to the engine via a front end accessory drive (such as FEAD 88 of FIG. 1), and rotated in proportion with engine speed via a belt, chain, etc. In one example, where pump 228 is a centrifugal pump, the pressure (and resulting flow) produced may be governed by the mode of operation of the cooling system 200 such that there is minimal usage of engine power for pump operation. An auxiliary electric pump 238, also a centrifugal pump, may also be included in second cooling circuit 204 to assist coolant flow through the EGR system and the turbocharger. Hot coolant may also flow to heater core 218 via an auxiliary pump 238. Auxiliary pump 238 may be employed to circulate coolant through heater core 218 during occasions when engine 220 is off (e.g., electric only operation) and/or to assist engine-driven pump 228 when the engine is running. Similarly, the flow of coolant produced by the electric pump 238 may be adjusted based on the mode of operation of the cooling system such that there is minimal usage of energy storage device (battery) power for pump operation. The temperature of the coolant may be regulated by a thermostat valve 240 which may be kept closed until the coolant reaches a threshold temperature.

Fan 230 may be coupled to radiator 216 in order to maintain airflow through radiator 216. The fan 230 may derive power from a system energy storage device (not shown), or may be coupled to the engine-driven water pump 228. The speed of the fan may be regulated by the controller based on selected cooling system operation mode.

At the heater core, heat may be transferred to a vehicle passenger compartment. After passing through the heater core, the coolant then flows back to engine 10. Heater core 218 may thus act as a heat exchanger between the coolant and the passenger compartment. Fins may be attached to the heater core to increase the surface area for heat transfer. Air may be forced past the fins, for example by operating a fan, to expedite heating of the passenger compartment. Degas bottle 232 is located at a high point in cooling circuit 204 and is configured to purge air from the coolant.

In order to provide desired cooling/heating to each component of both the higher temperature cooling circuit, and the lower temperature cooling circuit while minimizing engine power loss due to power usage of cooling system components, and aerodynamic drag caused by AGS opening, the cooling system may be operated in a mode selected based on the current vehicle and engine operating conditions. Also, the cooling system operational mode may be selected based on CAC condensate level and external weather conditions. Based on the selected mode, each of the AGS opening, vents 285 opening, radiator fan 230 speed, and pump 228, 238, and 208 speed may be adjusted. The different modes of operation of the cooling system are discussed in relation to FIG. 4.

In this way, the systems of FIGS. 1 and 2 provide for a vehicle system comprising: a powertrain including an engine and a transmission coupled to vehicle wheels, active grille shutters at a front end of the vehicle system, an insulated enclosure enclosing the engine, the enclosure including a plurality of vents on opposite walls, a turbocharger including an intake compressor and an exhaust turbine, a charge air cooler (CAC) coupled downstream of the compressor, a cooling system including a lower temperature coolant loop and a higher temperature coolant loop, the lower temperature coolant loop including a first coolant pump and a first radiator, the second coolant loop including a second coolant pump, a second radiator, and a radiator fan, and a controller with computer-readable instructions stored on non-transitory memory for: estimating a cooling demand for each of the engine and the transmission, initially selecting a plurality of operating modes of the cooling system that meet the cooling demand, wherein each of the initially selected plurality of modes has a different setting for components of the cooling system, comparing energy usage for each of the initially selected plurality of modes, and further selecting one of the initially selected plurality of modes having minimum energy usage.

Figure 3:
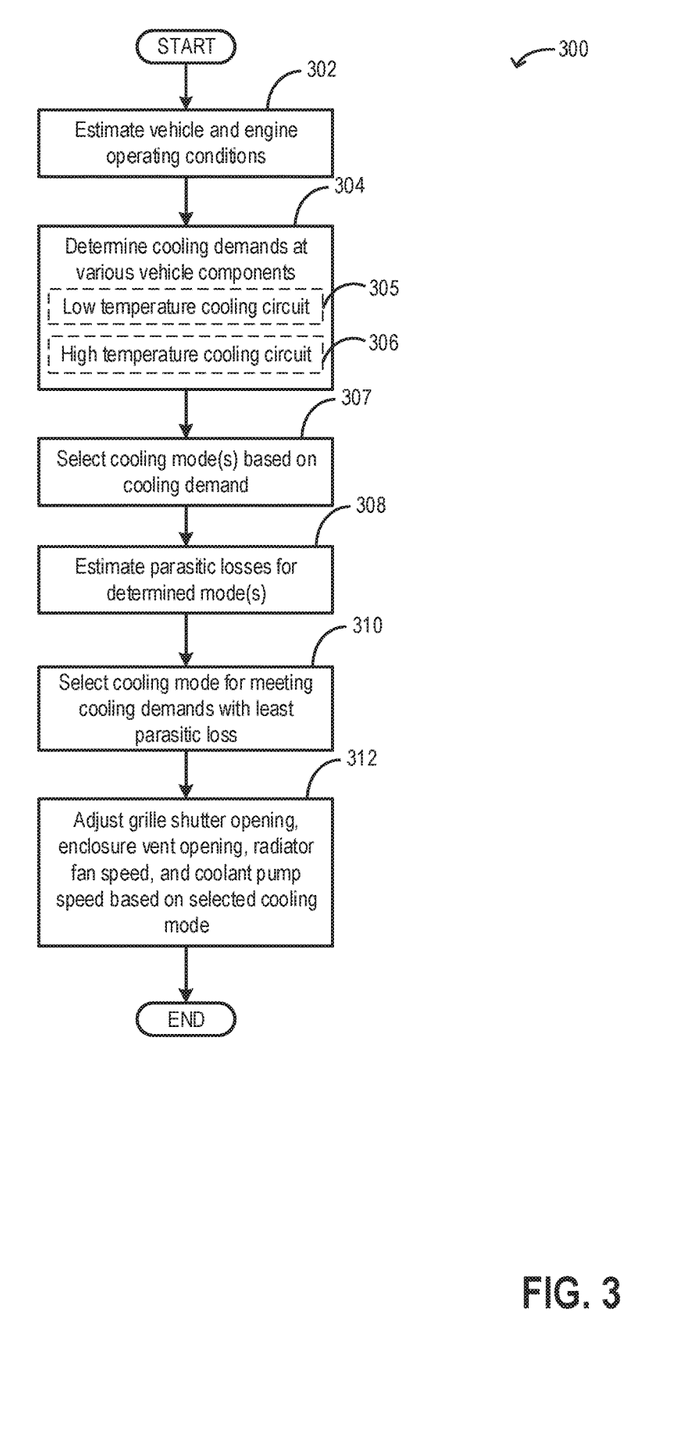
FIG. 3 shows a flow chart illustrating an example method that may be implemented to select a suitable mode of operation of the cooling system.

FIG. 3 illustrates an example method 300 for selecting a mode of operation of a vehicle cooling system (such as the cooling system 104 in FIG. 1). Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the routine includes estimating current vehicle and engine operating parameters including, for example, vehicle speed, engine load, engine speed, exhaust temperature, exhaust air-fuel ratio, coolant temperature, ambient air temperature, ambient air humidity, inlet and outlet charge air temperature, and inlet and outlet charge air pressure may de estimated from the plurality of vehicle system sensors. The charge air cooler (CAC) condensate level may be estimated based on CAC sensors such as such as CAC inlet air temperature and pressure sensors, CAC outlet air temperature and pressure sensors, etc. Also, temperature of other vehicle components such as the transmission system may also be estimated from a transmission oil temperature sensor. In addition, current weather conditions and weather forecast for planned route of travel may be retrieved from an onboard global positioning system (GPS) and wireless communications system.

Based on the estimated engine operating conditions, at 304, cooling demands of various vehicle components such as the engine, and the transmission may be determined. The engine cooling demand may be estimated based on the engine operating temperature, the rate of change in engine operating temperature as estimated based on an output of the exhaust temperature sensor. Similarly, the transmission cooling demand may be estimated based on the transmission oil temperature, the rate of change in transmission operating temperature as estimated based on an output of a transmission oil temperature sensor. As such, at 305, cooling demands of the different components of the lower temperature cooling circuit (such as the lower temperature cooling circuit 202 in FIG. 2) may be estimated based on the operating temperature, the rate of change of temperature (over time), and the operating conditions of each component. As an example, the components of the lower temperature cooling circuit include a lower temperature radiator, a coolant pump, an air-conditioning system (AC), and a water-air charge air cooler (CAC). In one example, if the temperature and/or the rate of change of temperature of the AC compressor is higher than a threshold, there may be an increase in cooling demand at the AC compressor. In another example, if there is an increase in CAC condensate level, there may be an increase in the heating need of the CAC so that the temperature of the CAC may be increased in order to cause a slowdown in condensate formation. In addition, a position of the CAC condensate (dew point) in the CAC may be determined based on parameters such as ambient air temperature, ambient air humidity, inlet and outlet charge air temperature, and inlet and outlet charge air pressure as well as other variables such as vehicle speed, fan speed, grille shutter position, etc. In addition to determining the dew point, the controller may also determine the amount of time the dew point has stayed at that position. If the time of dew point stagnation is over a set time limit, then the cooling system operational mode may be adjusted to shift the location of the dew point in order to reduce corrosive effects of CAC condensate on the surface of the CAC. The cooling system may select a mode suitable for optimal adjustments to the coolant pump speed such that the required cooling/heating demand may be fulfilled with minimal energy consumption by the pump.

At 306, cooling demands of the different components of the higher temperature cooling circuit (such as the high temperature cooling circuit 204 in FIG. 2) may be estimated based on the operating temperature, the rate of change of temperature, and operating conditions of each component. The components of the higher temperature cooling circuit may include the engine system enclosed within an insulated enclosure. In addition, other vehicle components such as the transmission system may also be a part of the high temperature cooling circuit. A plurality of cooling system components such as the vents on the walls of the engine enclosure, a plurality of coolant pumps, a radiator with a radiator fan, and active grille shutters (AGS) are part of the high temperature cooling circuit and may be adjusted accordingly to comply with the cooling/heating demands of the high temperature cooling circuit. In one example, the cooling demand of the engine may be estimated based on the temperature and/or the rate of change of temperature of the engine as determined from an exhaust gas temperature sensor (such as exhaust gas temperature sensor 126 in FIG. 1) and engine operating conditions. In another example, cooling demand of the engine may be determined based on upcoming route and weather conditions. A higher than threshold ambient humidity (such as in a car wash), and an indication of precipitation may be estimated based on an input of an ambient humidity sensor coupled to the vehicle. Also information obtained from an external server (such as a weather station) via the GPS and/or communications system, may be used to determine upcoming wet conditions in the route planned. There may be a variation in humidity based on altitude which may affect the cooling demand of vehicle components.

At 306, the controller may select one or more modes of operation of the cooling system (cooling modes) from the various different mode possible, the selected modes meeting the determined cooling demand. The various different cooling modes that the cooling system can operate in are discussed in detail at FIG. 4. Each of the selected cooling modes that meet the cooling demand may be defined by a specific setting of each of the cooling mode components such as AGS, engine enclosure vent, radiator fan, and coolant pump(s). As such, there may be multiple cooling modes that can meet the powertrain cooling demand. However, based on the settings of the cooling system components, the parasitic losses due to aerodynamic drag, energy usage from pump, and fan operations in each mode may vary. In addition to parasitic losses, each mode may also be associated with a different amount of CAC condensate generation. For example, during rainy conditions or high ambient humidity conditions, there is a higher propensity for CAC condensation, which can increase the risk of CAC corrosion.

Therefore in order to minimize the parasitic loss of engine power, at 308, parasitic losses corresponding to each selected cooling mode (as selected in step 306) may be estimated. Energy usage estimation for each of the plurality of operating modes of the cooling system may be carried out based on engine power usage and battery power usage during operation of each of a lower temperature coolant pump, a higher temperature coolant pump, and a radiator fan, and further based on aerodynamic drag during opening of the active grille shutters. In one example, the parasitic losses may include aerodynamic drag caused due to AGS opening causing engine power loss. In another example, the parasitic losses may occur due to engine and/or battery power consumption from operation of the radiator fan and the coolant system pump(s).

At 310, a suitable cooling mode capable of satisfying the cooling demands of the vehicle component while having the minimum parasitic loss may be selected out of the plurality of cooling modes determined at step 306. Based on the selected cooling mode, at 312, each of the AGS opening, the engine enclosure vent opening, the radiator fan speed, and the coolant pump(s) speed may be adjusted.

In one example, during vehicle operation at higher speed, in response to a higher than threshold engine temperature, in a first possible cooling mode, the AGS may be completely opened, and the vents may be completely opened to flow cooling ambient air through the engine to cool the engine. Alternatively, during the same operating condition and for the same cooling demand, in a second possible cooling mode, the AGS may be closed, the radiator fan speed and the coolant flow may be increased, and the vents may be completely opened to circulate cold air through the engine for engine cooling. The first cooling mode may have higher parasitic losses compared to the second cooling mode due to the increased level of aerodynamic drag caused by AGS opening during high speed operation of the vehicle. In this way, an engine controller may estimate a cooling demand for each of the vehicle components such as the engine and the transmission, and then initially select a plurality of operating modes of the cooling system that meet the cooling demand, wherein each of the initially selected plurality of modes has a different setting for components of the cooling system. The energy usage for each of the initially selected plurality of modes may then be compared, and one of the initially selected plurality of modes having minimum energy usage may be further selected. Based on the selected (final) operating mode, the engine controller may adjust each of an active grille shutter (AGS) opening, a radiator fan speed, an opening of the vents on the walls of the insulated engine enclosure, and speed of operation of a plurality of coolant pumps.

Figure 4:
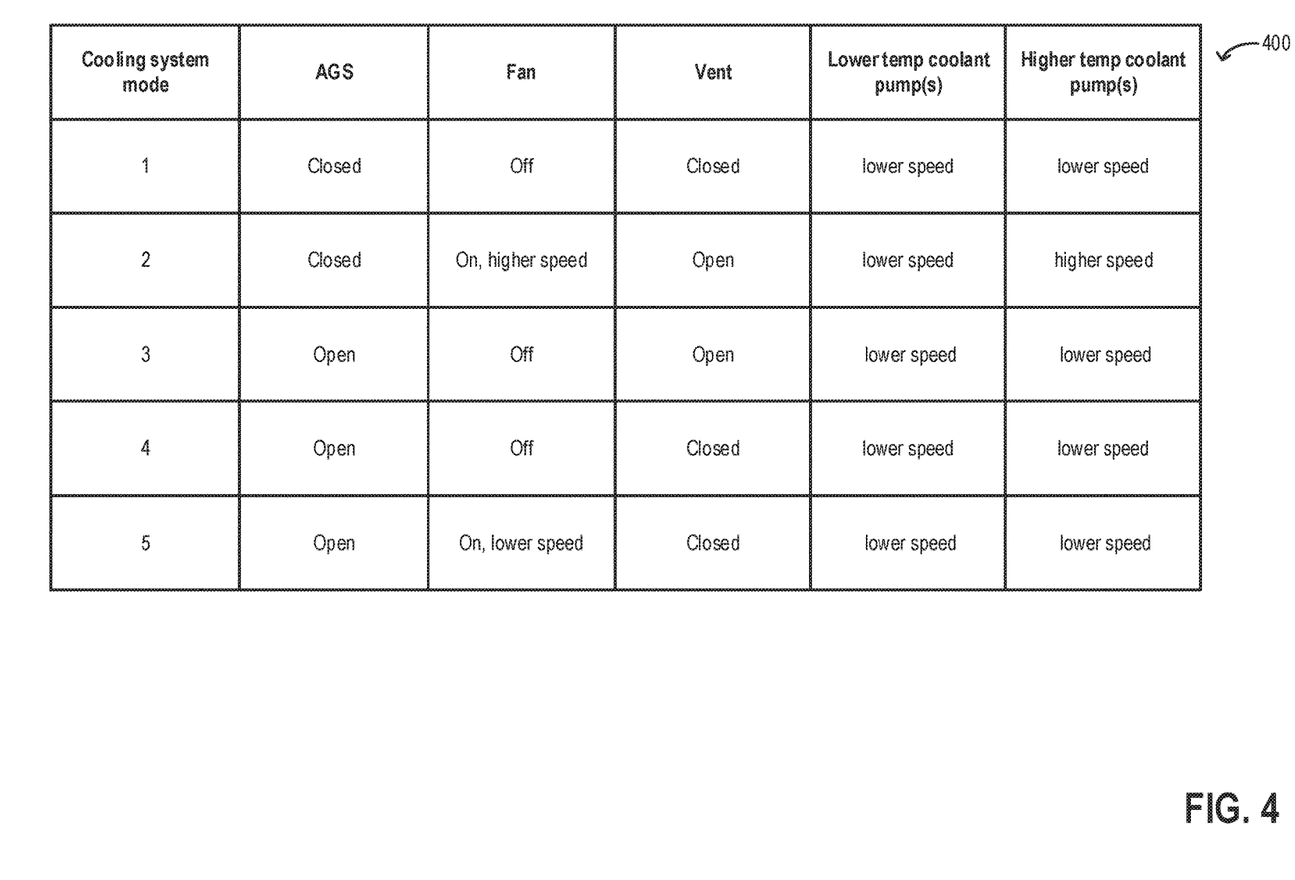
FIG. 4 shows a table illustrating example modes of operation of the cooling system.

FIG. 4 is a table 400 showing example modes of operation of the vehicle cooling system of FIGS. 1 and 2.

The cooling modes discussed herein are based on cooling demands of engine components, similar cooling modes may be used to satisfy cooling demands of other vehicle components such as the transmission, and the torque converter.

In one example, the controller may operate the vehicle cooling system in a first operating mode with each of active grille shutters on a vehicle body and vents on an insulated engine enclosure closed, each of a first and a second coolant pump operating at a lower speed, and a radiator fan disabled. The cooling system may be operated in the first mode during cold start conditions or when the engine temperature is lower and further engine cooling may not be desired. In the first operating mode, the AGS and the engine enclosure vents may be completely closed to reduce any flow of cooler ambient air from reaching the engine. The insulated enclosure may facilitate in engine heat retention (lower heat dissipation) and therefore may further expedite attainment of catalyst light-off temperature. The radiator fan may be not be operated to further reduce air flow through the engine. Also, each of the lower temperature circuit pump and the higher temperature circuit pumps may be operated at lower speeds to maintain a lower coolant flow rate via each of the lower temperature and the higher temperature cooling circuit. In the first operating mode, overall parasitic loss of engine power is lower as the AGS is closed, causing minimal aerodynamic drag. Also, since the fan is not operated, and the pumps are operated at lower speeds, usage of engine power is reduced. In this way, by adjusting the components of the cooling system, engine efficiency may be increased and engine heat may be conserved during cold start and lower temperature conditions.

In another example, the controller may operate the vehicle cooling system in a second operating mode with the active grille shutters closed, the vents open, the first coolant pump operating at the lower speed, the second coolant pump operating at a higher speed, and the radiator fan actuated to a higher speed. The cooling system may be operated in the second mode during conditions when the vehicle is operating at a higher speed, and the engine temperature is higher and engine cooling may be desired. In the second operating mode, due to the high vehicle speed, the AGS may be maintained in closed position in order to reduce parasitic losses due to aerodynamic drag. However since engine cooling is desired, the radiator fan may be switched on at a higher speed and the enclosure vents may be completely opened to allow circulation of cooling air through the engine. In addition, the coolant pumps of the higher temperature cooling circuit may be operated at a higher speed to increase coolant flow rate through the engine components. Heat from the engine system may be transferred to the coolant thereby having a cooling effect on the engine components. The coolant pump in the lower temperature cooling circuit may be operated at a lower speed based on cooling demands of the lower temperature circuit components.

The cooling system may be also operated in the second mode responsive to one or more of a higher than threshold level of condensate in the charge air cooler (CAC), a higher than threshold ambient humidity, and an indication of precipitation. The CAC condensate level may be inferred from details such as ambient air temperature, ambient air humidity, inlet and outlet charge air temperature, and inlet and outlet charge air pressure as estimated by a plurality of sensors. If the CAC condensate level increases to above a threshold level, during purging of the CAC, a higher amount of water may be ingested by the engine causing potential engine misfires. CAC condensation is accelerated at lower operating temperatures. Therefore, if it is observed that the CAC condensate level is above a threshold, the cooling system may be operated to retain heat and further hinder any decrease in temperature in the lower temperature cooling circuit. In yet another example, the controller may operate the cooling system in a third operating mode with each of the active grille shutters and the vents open, each of the first and second coolant pump operating at the lower speed, and the radiator fan disabled. The cooling system may be operated in the third mode during conditions when the vehicle is operating at a lower speed, but the engine temperature is higher and engine cooling is desired. In the third operating mode, due to the lower vehicle speed, AGS may be opened to a desired degree in order to admit cold ambient air into the engine system. The enclosure vents may be concurrently opened to allow the ambient air to circulate through the engine components, thereby cooling the system. Due to the lower vehicle speed, parasitic losses due to aerodynamic drag may be lower. In this cooling mode, since ambient air is circulated for engine cooling, in order to reduce parasitic losses due to consumption of engine and/or battery power, the radiator fan may be switched off and the high temperature circuit coolants pumps may be operated at a lower speed. The ambient air via the AGS effectively provide cooling to the lower temperature circuit components, therefore, the lower temperature circuit coolant pump may also be operated at a lower speed.

The controller may also operate the cooling system in the third operating mode during vehicle non-driven conditions with a higher engine temperature when engine cooling is desired. Determination of a non-driven condition may include detecting a vehicle condition such as a deceleration condition, a braking condition, a tip-out condition, a rate of change of engine speed being less than a predetermined threshold, a braking signal from an adaptive cruise control system (that senses a distance to a vehicle directly in front of the present vehicle and automatically actuates vehicle brakes to maintain a threshold separation from the preceding vehicle), or another type of condition signaling a non-driven vehicle condition. As an example, the non-driven vehicle condition may be when the depression amount of the driver's braking pedal is greater than a threshold value. As another example, the non-driven vehicle condition may be when the driver's braking effort (e.g., a force on the braking pedal) is greater than a threshold value. As yet another example, the non-driven vehicle condition may be when the brake pressure is greater than a threshold value. As even another example, the non-driven vehicle condition may be when the actuation degree of the vehicle brakes (e.g., electrically actuated brakes) is greater than a threshold value.

In a further example, the controller may operate the cooling system in a fourth mode with the active grille shutters open, the vents closed, each of the first and second coolant pump operating at the lower speed, and the radiator fan disabled. The cooling system may be operated in the fourth mode during conditions when the vehicle is operating at a lower speed and the engine requires lesser cooling. Therein, air may not be circulated through the insulating enclosure. The controller may also operate the cooling system in the fourth operating mode when the engine does not desire cooling but the AC condenser requests moderate cooling at lower vehicle speeds.

In a yet further example, the controller may operate the cooling system in a fifth operating with the active grille shutters open, the vents closed, each of the first and second coolant pump operating at the lower speed, and the radiator fan actuated to a lower speed. The cooling system may be operated in the fifth mode during conditions when the vehicle is operating at a lower speed and the engine may require lesser cooling. However, the cooling requirements for the engine and/or the AC condenser may be higher than those in the fourth mode. In order to provide the desired cooling, the radiator fan may be operated at a lower speed while the vents to the insulated enclosure may be maintained in a closed position. Therefore, operating in the fourth mode may include operating during each of a lower than threshold engine speed, and a lower than threshold air conditioning system temperature, and operating in the fifth mode may include each of a lower than threshold engine speed, and a higher than threshold air conditioning system temperature.

The cooling system mode may also be selected responsive to corrosion risk inside the CAC. A corrosion risk at the charge air cooler may be indicated based on a duration of stagnation of dew point at a specific location within the cooler being higher than a threshold duration. If the condensate is confined to a same point for a longer than threshold time period, a highly concentrated water and acid solution may form at this point, presenting significant corrosion risk. Adjustments to the AGS may be carried out based on the position of the dew point in order to move the location of the condensate. For example, if the dew point is to the left of a designated center position, AGS may be closed to decrease cooling and to move the dew point to the right side of the center position. Conversely, if the dew point is to the right of the designated center position, AGS may be opened to increase cooling and to move the dew point to the left side of the center position. Once the dew point has been shifted, the cooling system may be operated in a cooling mode selected based on the cooling demands, and associated parasitic losses.

In this way, different cooling modes may be selected taking into consideration cooling demands of the engine, CAC condensation, ambient conditions, and parasitic losses of engine power. It may be appreciated that in addition to the above mentioned modes of operation of the cooling system, there may be a plurality of possible operating modes suitable for fulfilling the cooling demands of the engine, the transmission, and other vehicle components. Transitioning between the cooling modes may be based on each of a powertrain component cooling demand, and a power usage of each mode. By operating the cooling system in the selected cooling mode, fuel efficiency and engine performance may be optimized.

Figure 5:
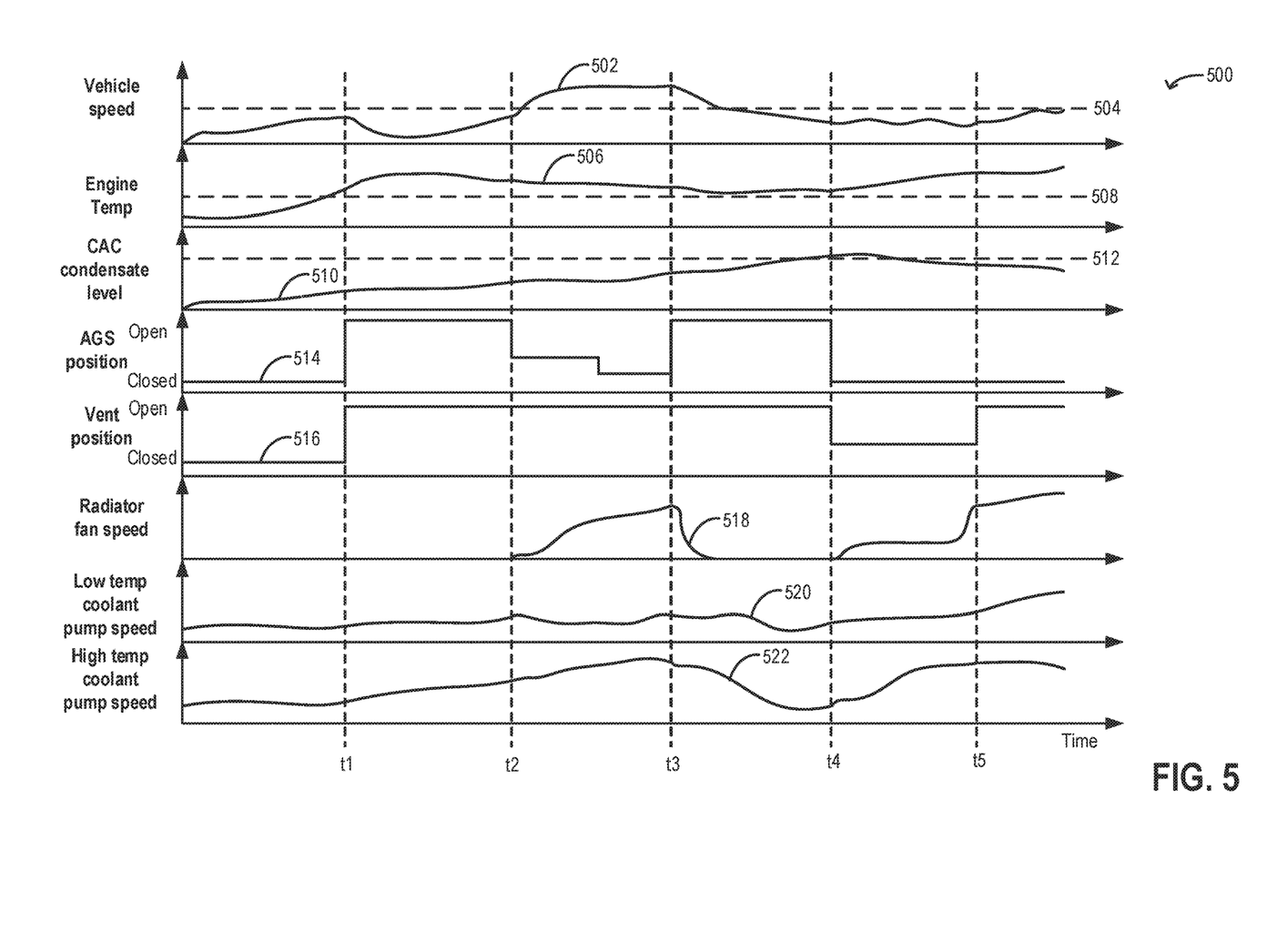
FIG. 5 shows an example operation of a plurality of components of the cooling system, according to the present disclosure.

FIG. 5 shows an example operating sequence 500 illustrating coordinated operation of a plurality of components of the cooling system as shown in FIGS. 1 and 2. Each component is adjusted based on engine cooling demands, and parasitic energy losses contributed by operation of the cooling system components. The horizontal (x-axis) denotes time and the vertical markers t1-t5 identify significant times in the operation of the cooling system.

The first plot, line 502, shows a variation in vehicle speed with time. Dotted line 504 shows a threshold vehicle speed above which aerodynamic drag caused by air entering the engine system via the opening of active grille shutters (AGS) located in the front end of the vehicle may cause significant loss in engine power. The second plot, line 506, shows a variation in engine temperature over time, as estimated via an engine coolant temperature sensor and/or an exhaust gas temperature sensor. Dotted line 508 shows a threshold engine temperature above which active engine cooling may be desired. The third plot, line 510, shows a level of condensate accumulated on a charge air compressor (CAC) housed in the engine intake manifold. Dotted line 512 shows a CAC condensate level above which further condensate accumulation may be controlled and condensate may be opportunistically purged. The fourth plot, line 514, shows an opening of the AGS and the fifth plot, line 516 shows an opening of the events on the side walls of an insulated enclosure surrounding the engine. The sixth plot, line 518, shows a variation in radiator fan speed based on engine cooling demands. The seventh plot, line 520, shows a variation in speed of operation of a pump coupled to the lower temperature cooling circuit of the cooling system and the eighth plot, line 522, shows a variation in speed of operation of a pump coupled to the higher temperature cooling circuit of the cooling system.

Prior to time t1, the engine starts from rest after a period of inactivity during which the vehicle was not propelled using the engine. The engine may start under cold-start conditions with lower than threshold engine temperature. During this time, heat generated at the engine may be conserved in order to increase in engine temperature. The insulated enclosure surrounding the engine may facilitate in heat retention by the engine during such conditions. The AGS, and the vents on the walls of the insulated enclosure may be closed to limit flow of air through the engine which may have an undesired cooling effect. During this time, due to the lower cooling demands of the engine, the radiator fan may not be operated and each of the lower temperature coolant pump and the higher temperature coolant pump may be operated at a lower speed. In this way, use of engine and/or battery power contributing to parasitic losses caused by the operation of the cooling system components may be reduced. Since the engine starts after a period of inactivity, the level of CAC condensate accumulation may be lower at this time.

At time t1, the engine temperature may increase to above the threshold level (line 508) and active cooling of the engine system may be desired between time t1 and t2. Since during this time, the vehicle speed is below the threshold speed, the AGS may be fully opened to facilitate engine cooling via ambient airflow, without causing an undesirable level of aerodynamic drag. The vents may also be opened in order to flow the ambient air entering the vehicle via the AGS through the engine. As a substantial cooling demand may be satisfied by the ambient air flow, parasitic losses may be lowered by not operating the radiator fan and by operating the lower temperature coolant pump at a lower speed. The high temperature coolant pump speed may be increased in order to increase the flow rate of coolant circulating through the engine components. Heat from the engine system may be transferred to the circulating coolant for dissipation to the atmosphere via a radiator.

At time t2, the vehicle speed may increase to higher than the threshold speed. Between time t2 and t3, the cooling demands of the engine system may continue to be higher due to the higher than threshold engine temperature. In response to the higher vehicle speed, the opening of the AGS may be reduced in order to reduce the air flow through the AGS and the consequent aerodynamic drag. The vents are continued to be maintained in the fully open position to facilitate flow of the ambient air through the engine system. Since the flow of ambient air may have reduced due to the partial closing of the AGS, the radiator fan may be operated at a higher speed in order to provide a cooling air flow through the engine. Also, the speed of operation of the higher temperature coolant pump may be further increased to increase the coolant flow rate and heat transfer from the engine components to the coolant. During this time, the AGS opening may be continued to be adjusted based on an increase in vehicle speed and a decrease in engine temperature. In this way, by continuously adjusting the cooling system components, parasitic losses due to aerodynamic drag and usage of engine and/or battery power may be optimized.

At time t3, a tip-out event may occur which initiates vehicle operation in a non-driven condition. In this condition, the controller may infer that there is an upcoming lower speed operation (between time t3 and t4). Due to the higher than threshold engine temperature, during the non-driven condition, between time t3 and t4 engine cooling may be carried out by completely opening the AGS and the enclosure vents to allow circulation of cold ambient air through the engine. Due to a larger part of the cooling demand being satisfied by the ambient air flow, during this time, parasitic losses may be lowered by not operating the radiator fan and by operating each of the lower temperature coolant pump and the higher temperature coolant pump at a lower speed. Also, during this time, the CAC condensate level is seen to increase steadily over time.

At time t4, the CAC condensate level may increase to above the threshold 512 and further increase in the condensate level may be controlled. The CAC condensate level may be inferred from conditions such as ambient air temperature, ambient air humidity, inlet and outlet charge air temperature, and inlet and outlet charge air pressure as estimated by a plurality of sensors. In order to reduce further condensation formation at the CAC, the temperature of the CAC may be increased. In response to a desire to increase the CAC temperature, the AGS may be fully closed in order to reduce the flow of cold ambient air through the engine system comprising the CAC. The opening of the vents may also be reduced to hinder air flow through the CAC. The lower temperature coolant pump may be operated at a lower speed in order to lower the coolant flowrate through the CAC. The radiator fan may be operated at a higher speed and the high temperature coolant pump speed may also be increased such that some cooling effect is provided to other components of the engine system which may be at a higher temperature.

At time t5, it may be inferred from the plurality of sensors that the CAC condensate level has decreased to below the threshold, and further CAC cooling may be desired. However, after time t4, it may be inferred that there is presence of wet conditions. Wet conditions, such as precipitation (e.g., rain, snow, hail, etc.), car wash, and high humidity, may be inferred through a humidity sensor and various wireless communication device applications and weather-forecasting websites. Current and future weather data may be correlated with current and future travel routes as obtained by the GPS coupled to the vehicle controller. In response to detection of wet conditions, the AGS may be maintained in closed position in order to hinder the entrance of any moisture through the shutters into the engine system. In order to provide cooling air circulation through the engine system, the radiator fan may be operated at a higher speed, and the vents of the engine enclosure may be fully opened to circulate the air from the fan throughout the engine system. Due to the wet weather conditions, the ambient temperature may decrease and further engine cooling may not be desired, therefore during this time, each of the lower temperature and the higher temperature coolant pumps may be operated at a lower speed to decrease the flowrate of the circulating coolant.

In this way, based on engine cooling demands, CAC conditions, and weather conditions, each of the components of the cooling system may be adjusted to provide the desired cooling while causing a minimal parasitic loss of engine power. By enclosing a vehicle powertrain component such as an engine system within an insulated enclosure, heat dissipation may be reduced and attainment of catalyst light-off temperature may be expedited during lower temperature operations. By providing vents on the walls of the enclosure, airflow through the engine components may be ensured and engine cooling may be effectively carried out during higher temperature operations. Also, by coordinating airflow through the engine via AGS and vent coordination, synergistic effects may be brought about in the cooling system at reduced parasitic losses.

One example method for a vehicle comprises estimating a powertrain component cooling demand based on operating conditions; and responsive to the powertrain component cooling demand, concurrently adjusting each of a radiator fan speed, a coolant system pump output, a vehicle grille shutter opening, and a vent opening of vents coupled to an engine insulating enclosure. In the preceding example, additionally or optionally, the operating conditions include temperature of a powertrain component, and a rate of change in temperature of the powertrain component over time. In any or all of the preceding examples, additionally or optionally, the powertrain component includes one of an engine, a transmission, and a torque converter. In any or all of the preceding examples, additionally or optionally, the concurrently adjusting includes selecting between a first mode of operation including a first setting of each of the radiator fan speed, the coolant system pump output, the vehicle grille shutter opening, and the vent opening, and a second mode of operation including a second, different setting of each of the radiator fan speed, the coolant system pump output, the vehicle grille shutter opening, and the vent opening based on energy loss in the first mode relative to energy loss in the second mode, wherein each of the first mode and the second mode meet the powertrain component cooling demand. In any or all of the preceding examples, additionally or optionally, the energy loss in the first mode is based on an electric power consumption for the first setting of the radiator fan speed and coolant system pump output, and an aerodynamic drag for the first setting of the vehicle grille shutter opening and the vent opening, and wherein the energy loss in the second mode is based on the electric power consumption for the second setting of the radiator fan speed and coolant system pump output, and an aerodynamic drag for the second setting of the vehicle grille shutter opening and the vent opening. In any or all of the preceding examples, additionally or optionally, the selecting includes selecting the first mode when the energy loss of the first mode is lower than the energy loss of the second mode, and selecting the second mode when the energy loss of the second mode is lower than the energy loss of the first mode. In any or all of the preceding examples, additionally or optionally, the engine is a turbocharged engine, and wherein the first setting of the first mode and the second setting of the second mode is further based on one or more of a condensate level in a charge air cooler coupled downstream of an intake compressor, local weather conditions, local weather forecast, and ambient humidity. In any or all of the preceding examples, additionally or optionally, when the condensate level is higher than a threshold, or when the local weather conditions include precipitation, the first setting of the first mode and the second setting of the second mode include the grill shutters being closed. In any or all of the preceding examples, additionally or optionally, the selecting between the first mode and the second mode is further based on the condensate level in the charge air cooler, the local weather conditions, the local weather forecast, and the ambient humidity. Any or all of the preceding examples further comprises, additionally or optionally, indicating a corrosion risk at the charge air cooler based on a duration of stagnation of dew point at a specific location within the cooler being higher than a threshold duration; and further selecting between the first mode and the second mode based on the indication, wherein the further selecting includes selecting one of the first and second mode having grille shutters closed responsive to the corrosion risk.

Another example method for a vehicle comprises operating a vehicle cooling system in a first mode with each of active grille shutters on a vehicle body and vents on an insulated engine enclosure closed, each of a first and a second coolant pump operating at a lower speed, and a radiator fan disabled; operating the vehicle cooling system in a second mode with the active grille shutters closed, the vents open, the first coolant pump operating at the lower speed, the second coolant pump operating at a higher speed, and the radiator fan actuated to a higher speed; operating the vehicle cooling system in a third mode with each of the active grille shutters and the vents open, each of the first and second coolant pump operating at the lower speed, and the radiator fan disabled; operating the vehicle cooling system in a fourth mode with the active grille shutters open, the vents closed, each of the first and second coolant pump operating at the lower speed, and the radiator fan disabled; and operating the vehicle cooling system in a fifth mode with the active grille shutters open, the vents closed, each of the first and second coolant pump operating at the lower speed, and the radiator fan actuated to a lower speed, wherein the first coolant pump is a lower temperature cooling circuit coolant pump, and the second coolant pump is a higher temperature cooling circuit coolant pump. The preceding example further comprises, additionally or optionally, selecting between the first, second, third, fourth, and fifth modes based on each of a powertrain component cooling demand, and a power usage of each mode, wherein the power usage of each mode is based on aerodynamic drag due to the active grille shutters and the vents, and electric power consumption of the radiator fan, and the first and second coolant pumps. In any or all of the preceding examples, additionally or optionally, the powertrain component cooling demand includes one or more of an engine cooling demand and a transmission cooling demand, the engine cooling demand based on an engine temperature and a rate of change in engine temperature during engine operation, the transmission cooling demand based on a transmission oil temperature and a rate of change in transmission oil temperature during engine operation. In any or all of the preceding examples, additionally or optionally, the selecting includes selecting a mode that meets the powertrain component cooling demand and has lowest power usage. In any or all of the preceding examples, additionally or optionally, the operating in the first mode includes operating during engine cold-start conditions, wherein operating in the second mode includes operating during each of a higher than threshold engine temperature and a higher than threshold engine speed, wherein operating in the third mode includes operating during each of a higher than threshold engine temperature and a lower than threshold engine speed, wherein operating in the fourth mode includes operating during each of a lower than threshold engine speed, and a lower than threshold air conditioning system temperature, and wherein operating in the fifth mode includes each of a lower than threshold engine speed, and a higher than threshold air conditioning system temperature. In any or all of the preceding examples, additionally or optionally, the vehicle system includes a turbocharged engine with an intake compressor and a charge air cooler coupled downstream of the compressor, the method further comprises operating the vehicle cooling system in a sixth mode with the grille shutters closed, the sixth mode selected responsive to one or more of a higher than threshold level of condensate in the charge air cooler, a higher than threshold ambient humidity, and an indication of precipitation. In any or all of the preceding examples, additionally or optionally, the low temperature cooling circuit coolant pump is configured to circulate coolant through the charge air cooler, and an air conditioning system and wherein the higher temperature cooling circuit coolant pump is configured to circulate coolant through each of the turbocharged engine and a transmission.

In yet another example a vehicle system comprises a powertrain including an engine and a transmission coupled to vehicle wheels, active grille shutters at a front end of the vehicle system, an insulated enclosure enclosing the engine, the enclosure including a plurality of vents on opposite walls, a turbocharger including an intake compressor and an exhaust turbine, a charge air cooler (CAC) coupled downstream of the compressor, a cooling system including a lower temperature coolant loop and a higher temperature coolant loop, the lower temperature coolant loop including a first coolant pump and a first radiator, the second coolant loop including a second coolant pump, a second radiator, and a radiator fan, and a controller with computer-readable instructions stored on non-transitory memory for: estimating a cooling demand for each of the engine and the transmission, initially selecting a plurality of operating modes of the cooling system that meet the cooling demand, wherein each of the initially selected plurality of modes has a different setting for components of the cooling system, comparing energy usage for each of the initially selected plurality of modes, and further selecting one of the initially selected plurality of modes having minimum energy usage. The preceding example further comprises, additionally or optionally, an exhaust temperature sensor coupled to an exhaust manifold and a transmission oil temperature sensor coupled to the transmission, wherein the controller includes further instructions for: estimating the cooling demand for the engine based on an output of the exhaust temperature sensor, and estimating the cooling demand for the transmission based on an output of the transmission oil temperature sensor. In any or all of the preceding examples, additionally or optionally, the controller includes further instructions for: estimating the energy usage for each of the plurality of operating modes of the cooling system based on engine power usage and battery power usage during operation of each of the lower temperature coolant pump, the higher temperature coolant pump, and the radiator fan, and further based on aerodynamic drag during opening of the active grille shutters.

In this way, by computing a cooling demand for a vehicle power train component and selecting a mode of operation of the cooling system wherein each of the components including the adjustable vents, the AGS, the coolant pump, and a cooling fan are adjusted concurrently, cooling demands of the component may be satisfied while parasitic losses caused by power usage and aerodynamic drag may be minimized. Therefore, engine performance and fuel efficiency may be improved. The technical effect of enclosing a vehicle powertrain component such as an engine system within an insulated enclosure, heat may be preserved during low temperature operations. By reducing heat dissipation from the engine system during cold-start conditions, attainment of catalyst light-off temperature may be expedited thereby improving emissions quality.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
estimating a powertrain component cooling demand based on operating conditions;
responsive to the powertrain component cooling demand, concurrently adjusting each of a radiator fan speed, a coolant system pump output, a vehicle grille shutter opening, and a vent opening of vents coupled to an engine insulating enclosure, wherein the concurrently adjusting includes selecting between a first mode of operation including a first setting of each of the radiator fan speed, the coolant system pump output, the vehicle grille shutter opening, and the vent opening, and a second mode of operation including a second, different setting of each of the radiator fan speed, the coolant system pump output, the vehicle grille shutter opening, and the vent opening based on energy loss in the first mode relative to energy loss in the second mode, wherein each of the first mode and the second mode meets the powertrain component cooling demand.

2. The method of claim 1, wherein the operating conditions include a temperature of a powertrain component, and a rate of change in temperature of the powertrain component over time.

3. The method of claim 2, wherein the powertrain component includes one of an engine, a transmission, and a torque converter, and wherein the vent opening permits ambient airflow through the powertrain component.

4. The method of claim 1, wherein the energy loss in the first mode is based on an electric power consumption for the first setting of the radiator fan speed and the coolant system pump output, and an aerodynamic drag for the first setting of the vehicle grille shutter opening and the vent opening, and wherein the energy loss in the second mode is based on an electric power consumption for the second setting of the radiator fan speed and coolant system pump output, and an aerodynamic drag for the second setting of the vehicle grille shutter opening and the vent opening.

5. The method of claim 1, wherein the selecting includes selecting the first mode when the energy loss of the first mode is lower than the energy loss of the second mode, and selecting the second mode when the energy loss of the second mode is lower than the energy loss of the first mode.

6. The method of claim 1, wherein an engine is a turbocharged engine, and wherein the first setting of the first mode and the second setting of the second mode are further based on one or more of a condensate level in a charge air cooler coupled downstream of an intake compressor, local weather conditions, local weather forecast, and ambient humidity.

7. The method of claim 6, wherein, when the condensate level is higher than a threshold, or when the local weather conditions include precipitation, the first setting of the first mode and the second setting of the second mode include grille shutters being closed.

8. The method of claim 6, wherein the selecting between the first mode and the second mode is further based on the condensate level in the charge air cooler, the local weather conditions, the local weather forecast, and the ambient humidity.

9. The method of claim 6, further comprising:
indicating a corrosion risk at the charge air cooler based on a duration of stagnation of dew point at a specific location within the charge air cooler being higher than a threshold duration; and
further selecting between the first mode and the second mode based on the indication, wherein the further selecting includes selecting one of the first and second modes having grille shutters closed responsive to the corrosion risk.

10. A vehicle method, comprising:
operating a vehicle cooling system in a first mode with each of active grille shutters on a vehicle body and vents on an insulated engine enclosure closed, each of a first coolant pump and a second coolant pump operating at a lower speed, and a radiator fan disabled;
operating the vehicle cooling system in a second mode with the active grille shutters closed, the vents open, the first coolant pump operating at the lower speed, the second coolant pump operating at a higher speed, and the radiator fan actuated to a higher speed;
operating the vehicle cooling system in a third mode with each of the active grille shutters and the vents open, each of the first and second coolant pumps operating at the lower speed, and the radiator fan disabled;
operating the vehicle cooling system in a fourth mode with the active grille shutters open, the vents closed, each of the first and second coolant pumps operating at the lower speed, and the radiator fan disabled; and
operating the vehicle cooling system in a fifth mode with the active grille shutters open, the vents closed, each of the first and second coolant pumps operating at the lower speed, and the radiator fan actuated to a lower speed, wherein the first coolant pump is a lower temperature cooling circuit coolant pump, and the second coolant pump is a higher temperature cooling circuit coolant pump.

11. The method of claim 10, further comprising selecting between the first, second, third, fourth, and fifth modes based on each of a powertrain component cooling demand and a power usage of each mode, wherein the power usage of each mode is based on aerodynamic drag due to the active grille shutters and the vents, and electric power consumption of the radiator fan and the first and second coolant pumps.

12. The method of claim 11, wherein the powertrain component cooling demand includes one or more of an engine cooling demand and a transmission cooling demand, the engine cooling demand based on an engine temperature and a rate of change in engine temperature during engine operation, the transmission cooling demand based on a transmission oil temperature and a rate of change in transmission oil temperature during engine operation.

13. The method of claim 11, wherein the selecting includes selecting a mode that meets the powertrain component cooling demand and has lowest power usage.

14. The method of claim 10, wherein operating in the first mode includes operating during engine cold-start conditions, wherein operating in the second mode includes operating during each of a higher than threshold engine temperature and a higher than threshold engine speed, wherein operating in the third mode includes operating during each of the higher than threshold engine temperature and a lower than threshold engine speed, wherein operating in the fourth mode includes operating during each of the lower than threshold engine speed and a lower than threshold air conditioning system temperature, and wherein operating in the fifth mode includes operating during each of the lower than threshold engine speed and a higher than threshold air conditioning system temperature.

15. The method of claim 10, wherein the vehicle cooling system includes a turbocharged engine with an intake compressor and a charge air cooler coupled downstream of the compressor, the method further comprising:
operating the vehicle cooling system in the second mode responsive to one or more of a higher than threshold level of condensate in the charge air cooler, a higher than threshold ambient humidity, and an indication of precipitation.

16. The method of claim 15, wherein the lower temperature cooling circuit coolant pump is configured to circulate coolant through the charge air cooler and an air conditioning system, and wherein the higher temperature cooling circuit coolant pump is configured to circulate coolant through each of the turbocharged engine and a transmission.

* * * * *